United States Patent Office 2,883,371
Patented Apr. 21, 1959

2,883,371

PROCESS FOR POLYMERIZING UNSATURATED COMPOUNDS USING A SULFONYL TRIAZENE AS A CATALYST

Walter M. Thomas, Darien, and Frank A. V. Sullivan, Glenbrook, Conn., and William B. Hardy, Bound Brook, N.J., assignors to American Cyanamid Company, New York, N.Y., a corporation of Maine No Drawing. Application March 5, 1956
Serial No. 569,224

18 Claims. (Cl. 260—85.5)

This invention relates to novel polymerization catalysts useful in the polymerization of ethylenically unsaturated compounds. More particularly, the invention relates to the catalytic polymerization of ethylenically unsaturated polymerizable monomers with sulfonyl triazene initiators.

Ethylenically unsaturated polymerizable compounds may be polymerized by a number of different reactions. Thus, for example, techniques, such as bulk, bead, solution, and emulsion polymerization have been practiced in the past. In each instance it is usually desirable to add a polymerization catalyst to the materials being polymerized in order to expedite the reaction. Heat and light, as well as X-ray or gamma ray radiation, may also be employed in combination with the polymerization catalyst if desired.

It is believed that during a free radical polymerization reaction a free radical formed by the decomposition of the catalyst reacts with the monomers present and initiates polymerization. The organic peroxide and azo-type catalyst are well known for this purpose. However, in certain instances, as for example, in the presence of various compounds which may be present in either the monomer or in the solvents or modifiers employed therewith, the peroxide catalysts often are or sometimes become ineffective initiators for the polymerization reaction. In accordance with the present invention, a novel polymerization catalyst has been found that is useful in the polymerization of ethylenically unsaturated compounds.

It is therefore an object of our invention to polymerize polymerizable ethylenically unsaturated compounds in the presence of novel polymerization catalyst. This and other objects of our invention will be discussed more fully hereinbelow.

In a pending U.S. patent application Serial No. 475,291, filed on December 14, 1954, now Patent No. 2,834,764, it is disclosed that addition polymerization reactions may be carried out utilizing as the polymerization catalyst various N-substituted benzosulfotriazines. These heterocyclic compounds are represented by the general formula

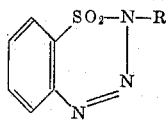

wherein "R" is selected from the group consisting of alkyl radicals of from 1 to 6 carbon atoms, aryl radicals of from 6 to 12 carbon atoms, aralkyl radicals, cycloalkyl radicals and chloro- and hydroxy-derivatives of such radicals.

The heterocyclic benzosulfotriazines therein employed are prepared by diazotizing the appropriate N-substituted 2-aminobenzosulfonamide. Upon completion of the diazotization reaction, the diazonium solution is poured into water with stirring. The product separates rapidly as crystals which may be recovered in any manner, such as by filtration, washed with water and dried.

We have now found that an improved rate of polymerization and increased control of molecular weight may be obtained by employing compounds containing the triazene radical

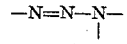

as polymerization initiators. These compounds are more specifically characterized by the general formula

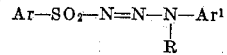

in which "Ar" and "Ar$^1$" are alkyl-substituted and unsubstituted aryl, i.e., aryl and alkaryl, groups and "R" is a member selected from the class consisting of alkyl and cyano-alkyl radicals having 1 to 4 carbon atoms.

The sulfonyl triazenes of the present invention may be prepared by known techniques, such as by reacting a phenylamine and a nitrite compound to form an aryl azo compound which in turn is reacted with an aryl sulfonamide and an organic salt, such as an alkyl sulfate; or the aryl azo compound may be reacted with an aryl sulfonamide and a nitrile, such as acrylonitrile in the case of cyanoalkyl sulfonyl triazenes. More detailed preparation of illustrative sulfonyl triazene polymerization initiators employed in the present invention are set forth in the examples which follow.

In order that the present invention may be more fully understood, the following examples are set forth for purposes of illustration only, and any specific enumeration of details should not be interpreted as a limitation, except as expressed in the appended claims:

EXAMPLE 1

*1-benzenesulfonyl-3-methyl-3-phenyl-triazene*

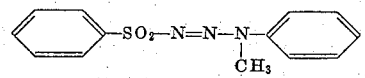

A solution of benzene diazonium chloride is prepared by adding 70 parts of sodium nitrite in 150 parts of water to a solution of 93 parts of aniline in 420 parts of water and 380 parts of concentrated hydrochloric acid with stirring at 0° C. to 5° C. The resultant solution is added with stirring to a chilled solution of 160 parts of benzene sulfonamide in 10,000 parts of 2% aqueous sodium hydroxide solution, followed by the addition over a one-hour period of 265 parts of dimethyl sulfate. Agitation is continued until reaction is substantially complete and the solid product is removed by filtration. The product is crystallized from methanol to give a good yield of product of excellent purity, M.P. 94° C. to 95° C.

EXAMPLE 2

*1-benzenesulfonyl-3-β-cyanoethyl-3-phenyl-triazene*

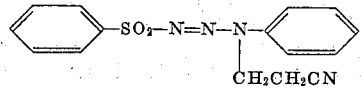

To a solution of 28 parts of aniline in a mixture of 125 parts of water and 107 parts of 37% hydrochloric acid is added at 0° C. to 5° C. a solution of 21 parts of sodium nitrite in 40 parts of water. The resultant solution is then added with stirring to a solution prepared by adding 120 parts of 50% sodium hydroxide solution to 2,000 parts of water, to which is further added 48 parts of benzene sulfonamide. Eighty parts of acrylonitrile is then added, and the mixture is stirred and the temperature maintained below 5° C. until the reaction is substantially complete. The product is isolated by filtration, washed with water and dried at a temperature maintained below 5° C. until the reaction is substantially complete. The product is isolated by filtration, washed with water and dried at a temperature not over 50° C., M.P. 109° C. to 110° C.

EXAMPLE 3

1(p-toluenesulfonyl)-3-methyl-3-phenyl-triazene

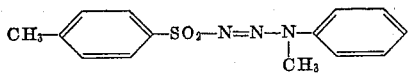

A solution of benzene diazonium chloride is prepared by adding 70 parts of sodium nitrite in 150 parts of water to a solution of 93 parts of aniline in 420 parts of water and 380 parts of concentrated hydrochloric acid with stirring at 0° C. to 5° C. The resultant solution is added with stirring to a chilled solution of 175 parts of p-toluene sulfonamide in 10,000 parts of 2% aqueous sodium hydroxide solution, followed by the addition over a one-hour period of 265 parts of dimethyl sulfate. Agitation is continued until reaction is substantially complete and the solid product is removed by filtration. The product when recrystallized from methanol melts at 124° C. to 125° C.

EXAMPLE 4

1-(p-toluenesulfonyl)-3-β-cyanoethyl-3-phenyl-triazene

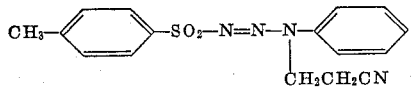

To a solution of 74.4 parts of aniline in a mixture of 330 parts of water and 240 parts of 37% hydrochloric acid is added at 0.5° C. 116 parts of 5 N sodium nitrite solution. This solution is then added with stirring to a solution at 0° C. to 5° C. prepared by adding 323 parts of 50% sodium hydroxide solution to 5,500 parts of water, to which is further added 144 parts of p-toluene sulfonamide. 213 parts of acrylonitrile is then added with stirring and the mixture further stirred and allowed to stand at room temperature until the reaction is substantially complete. The product is isolated by filtration, washed with water and dried at a temperature not over 50° C. The dry material thus prepared melts at 105° C. to 106° C., but the melting point may be raised to 110° C. by recrystallization from benzene.

Examples of other sulfonyl triazenes that may be employed as initiators in polymerizable compounds which have a $CH_2=C<$ group are such as 1-benzenesulfonyl-3-ethyl-3-phenyl triazene, 1-benzenesulfonyl-3-propyl-3-phenyl triazene, 1-benzenesulfonyl-3-butyl-3-phenyl triazene, 1-toluenesulfonyl-3-ethyl-3-phenyl triazene, 1-toluenesulfonyl-3-propyl-3-phenyl triazene, 1-toluenesulfonyl-3-butyl-3-phenyl triazene, 1-xylenesulfonyl-3-methyl-3-phenyl triazene, 1 - benzenesulfonyl - 3-cyanomethyl-3-phenyl triazene, 1-(p-toluenesulfonyl)-3-cyanomethyl-3-phenyl triazene, and the like. It has previously been believed that such compounds were quite stable to both dry and wet heat and that it was possible to heat these products to their melting point with little or no decomposition. The discovery that these compounds are excellent polymerization catalysts is wholly unexpected, inasmuch as in accordance with this invention, the addition polymerization reaction may be carried out at temperatures well below the decomposition point of said materials.

The sulfonyl triazene compounds may be used according to the present invention for the polymerization of polymerizable ethylenically unsaturated compounds which are characterized by the polymerizable $CH_2=C<$ group. Examples of such compounds are well known. Thus, for example, the styrene compounds represented by the general formula

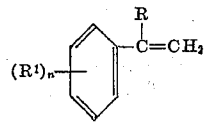

wherein "R" is selected from the group consisting of hydrogen, a halogen and a methyl radical and "$R^1$" is a substituent selected from the group consisting of hydrogen, a halogen, a lower alkyl radical and a halogenated lower alkyl radical, and "$n$" is an integer between 0 and 2, may be polymerized herein. Compounds of this nature are such as styrene per se, chloro- and dichlorostyrene, methylstyrene, chloromethyl styrene, α-methyl styrene, dimethylstyrene, ethylstyrene, diethylestyrene, and the like. Other ethylenically unsaturated compounds that may be advantageously polymerized and copolymerized in accordance with this invention are the ethylenically unsaturated polymerizable compounds containing a $CH_2=C<$ group and having a boiling point of at least 60° C. As such are the acrylyl and alkacrylyl monomers, e.g., acrylonitrile, methyl acrylate, ethyl methacrylate, methacrylic acid, acrylamide, methacrylamide, methyl vinyl ketone, methyl vinyl ether, etc., vinyl and vinylidene halides, e.g., vinyl fluoride, vinylidene chloride, etc.; vinyl carboxylates, e.g., vinyl acetate, vinyl trimethylacetate, and the like; vinyl imides, e.g., N-vinylphthalimide. In addition to the polymerization of the compounds listed hereinabove, compounds having more than a single unit of ethylenic unsaturation are also polymerizable in accordance with this invention. These compounds include such as the polymerizable ethylenically unsaturated polycarboxylic acid-polyhydroxy alcohol polyesters and includes the polymerization of fumaric and maleic polyesters with the aforementioned compounds containing the $CH_2=C<$ group and having a boiling point of at least 60° C. The term polymerization as used herein is intended to include within its scope, in addition to homopolymerization, copolymerization, of two or more of the monomers, as for example, methylstyrene-α-methylstyrene copolymer, styrene- or methylstyrene-acrylonitrile copolymer, and the like. The present invention is applicable to the polymerization of any monoethylenically unsaturated compound which has been polymerized by an addition polymerization as practiced in the prior art. Optimum polymerization conditions may vary from monomer to monomer but may be easily determined by those skilled in the art.

Illustrative examples of the preparation of polymers utilizing the sulfonyl triazenes according to the invention are set forth in the following examples:

EXAMPLE 5

Monomers to be polymerized are sealed in suitable vessels, preferably glass lined, under nitrogen along with 0.1% to 0.3% of the sulfonyl triazene initiators. The vessels are heated at temperatures ranging from 60° C. to 100° C. for varying lengths of time, cooled and opened. Polymers were recovered by precipitation from methanol.

Table I lists the data obtained for various illustrative polymers employing the foregoing procedure.

TABLE I

| Monomer | Initiator [1] | | Temp., °C. | Hours | Percent Conversion |
| --- | --- | --- | --- | --- | --- |
| | Type | Percent | | | |
| Styrene | | | 95–102 | 5 | 8.0 |
| Do | I | 0.09 | 95–102 | 5 | 18.9 |
| Do | II | 0.10 | 95–102 | 5 | 23.2 |
| Methyl methacrylate | | | 78–81 | 4 | 4.6 |
| Do | I | 0.20 | 78–81 | 4 | 73.9 |
| Do | II | 0.20 | 78–81 | 4 | 81.7 |
| Acrylonitrile | | | 55–59 | >5 | 0 |
| Do | I | 0.30 | 55–59 | 1.25 | 41.5 |
| Do | II | 0.32 | 55–59 | 5.45 | 6.9 |

[1] I. 1-benzenesulfonyl-3-β-cyanoethyl-3-phenyl triazene. II. 1-benzenesulfonyl-3-methyl-3-phenyl triazene.

EXAMPLE 6

Two portions of styrene and acrylonitrile (3:1 weight ratio) are sealed under air in a glass lined vessel, the first with 0.2% of I, 1-benzenesulfonyl-3-β-cyanoethyl-3- phenyl triazene initator, and the second with benzoyl peroxide. The vessels are heated for 3 hours at 110°. The polymer containing I is found substantially lighter in color than the benzoyl peroxide control.

EXAMPLE 7

Methylstyrene and acrylonitrile containing from 0.1% to 0.2% of initiator, are polymerized under a nitrogen atmosphere in a sealed glass vessel. The vessel is heated from 84° C. to 100° C. for varying lengths of time, cooled and opened. Polymers are recovered by precipitation from methanol.

The results of various runs made with the specific catalyst and amount employed are tabulated below:

| Run No. | Monomer | | Initiator | | Time (Hrs.) | Temp., °C. | Yield, Parts |
|---|---|---|---|---|---|---|---|
| | Type | Parts | Type | Percent | | | |
| 1 | Me sty + Acrylo | 3 1 | I | 0.1 | 3 | 84–87 | 1.74 |
| 2 | Me sty + Acrylo | 3 1 | II | 0.1 | 3 | 84–87 | 1.60 |
| 3 | Me sty + Acrylo | 3 1 | Blank | | 3 | 84–87 | 0.56 |
| 4 | Me sty | 4 | III | 0.2 | 3 at 84–87 and additional 1 at 100 | | 1.10 |
| 5 | Me sty | 4 | IV | 0.2 | Same as Run 4 | | 0.69 |
| 6 | Me sty | 4 | Blank | | Same as Run 4 | | 0.058 |

I. 1-benzenesulfonyl-3-β-cyanoethyl-3-phenyl triazene.
II. 1-(p-toluenesulfonyl)-3-methyl-3-phenyl triazene.
III. 1-benzenesulfonyl-3-methyl-3-phenyl triazene.
IV. 1-(p-toluenesulfonyl)-3-β-cyanoethyl-3-phenyl triazene.

The marked superiority of polymers employing the invention as respects yield, color, and other characteristics demonstrates the usefulness of the initiator of the invention, as for example, in making light colored copolymers for molding applications. The use of sulfonyl triazene initiators have been found particularly advantageous where the monomers, solvents, or modifiers are of such a nature as to render other initiators ineffective, as for example, where peroxides are employed in the presence of certain amines. Monomers containing the N-allyl function may also be polymerized with these compounds. Also these compounds impart better color stability toward heat than do conventional initiators.

The catalyst herein employed should be present in catalytic amounts during the polymerization reaction. The amount of the catalyst necessary will vary according to the particular monomers being polymerized. Generally, amounts from as little as 0.01% up to about 5% by weight, based on the total weight of monomers, of the catalyst may be used. It is preferred that the amount of the catalyst present be within the order of from about 0.05% to about 3% of the weight of the monomers. The temperature employed during the polymerization reaction will also depend upon the particular polymerization recipe. It is preferred that the polymerization temperature be within the range of from about 35° C. to about 120° C. In certain instances temperatures falling outside of this range may be employed, but generally this temperature range is satisfactory for the production of the polymeric materials.

As previously indicated, the novel catalyst used in accordance with the present invention may be added to the monomers which may be polymerized in accordance with processes known in the prior art. If desired, lubricants, dyes, pigments, and modifying agents, regulators, emulsifiers, etc., may be added, as the circumstances may warrant, in effecting the polymerization reaction.

It will be apparent that various modifications are possible within the scope of the instant invention, and any enumeration of specific details is not intended to limit the invention, except as defined in the appended claims.

We claim:
1. A process for catalytically polymerizing polymerizable compounds containing an $H_2C=C<$ group comprising reacting said compound in the presence of a sulfonyl triazene polymerization catalyst having the general formula

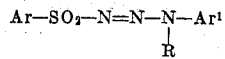

wherein "Ar" and "Ar¹" are substituents selected from the group consisting of aryl and alkaryl groups and "R" is selected from the group consisting of alkyl and cyanoalkyl radicals having from 1 to 4 carbon atoms.

2. A process for catalytically polymerizing a compound of the general formula

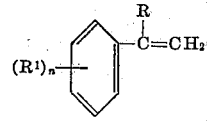

wherein "R" is selected from the group consisting of hydrogen, a halogen and a methyl radical and "R¹" is a substituent selected from the group consisting of hydrogen, a halogen, a lower alkyl radical and a halogenated lower alkyl radical, and "n" is an integer between 0 and 2, comprising reacting said compound in the presence of a sulfonyl triazene polymerization catalyst having the general formula

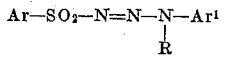

wherein "Ar" and "Ar¹" are substituents selects from the group consisting of aryl and alkaryl groups and "R" is selected from the group consisting of alkyl and cyanoalkyl radicals having from 1 to 4 carbon atoms.

3. A process for catalytically copolymerizing acrylonitrile and a monomer having the general formula

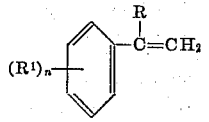

wherein "R" is selected from the group consisting of hydrogen, a halogen and a methyl radical and "R¹" is a substituent selected from the group consisting of hydrogen, a halogen, a lower alkyl radical and a halogenated lower alkyl radical, and "n" is an integer between 0 and 2, comprising reacting said monomers in the presence of a sulfonyl triazene polymerization catalyst having the general formula

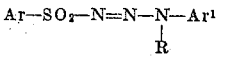

wherein "Ar" and "Ar¹" are substituents selected from the group consisting of aryl and alkaryl groups and "R" is selected from the group consisting of alkyl and cyanoalkyl radicals having from 1 to 4 carbon atoms.

4. A process for catalytically polymerizing acrylonitrile comprising reacting said acrylonitrile in the presence of a sulfonyl triazene polymerization catalyst having the general formula

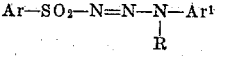

wherein "Ar" and "Ar¹" are substituents selected from the group consisting of aryl and alkaryl groups and "R" is selected from the group consisting of alkyl and cyanoalkyl radicals having from 1 to 4 carbon atoms.

5. A process for catalytically polymerizing styrene comprising reacting said styrene in the presence of a sulfonyl triazene polymerization catalyst having the general formula

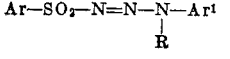

wherein "Ar" and "Ar¹" are substituents selected from the group consisting of aryl and alkaryl groups and "R" is selected from the group consisting of alkyl and cyanoalkyl radicals having from 1 to 4 carbon atoms.

6. A process for catalytically polymerizing methylstyrene comprising reacting said methylstyrene in the presence of a sulfonyl triazene polymerization catalyst having the general formula

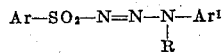

wherein "Ar" and "Ar¹" are substituents selected from the group consisting of aryl and alkaryl groups and "R" is selected from the group consisting of alkyl and cyanoalkyl radicals having from 1 to 4 carbon atoms.

7. A process for polymerizing methyl methacrylate comprising reacting said methyl methacrylate in the presence of a sulfonyl triazene polymerization catalyst having the general formula

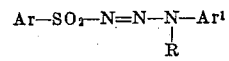

wherein "Ar" and "Ar¹" are substituents selected from the group consisting of aryl and alkaryl groups and "R" is selected from the group consisting of alkyl and cyanoalkyl radicals having from 1 to 4 carbon atoms.

8. A process for copolymerizing acrylonitrile and styrene monomers comprising reacting said monomers in the presence of a sulfonyl triazene polymerization catalyst having the general formula

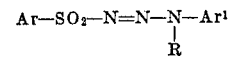

wherein "Ar" and "Ar¹" are substituents selected from the group consisting of aryl and alkaryl groups and "R" is selected from the group consisting of alkyl and cyanoalkyl radicals having from 1 to 4 carbon atoms.

9. A process for copolymerizing acrylonitrile and methylstyrene monomers comprising reacting said monomers in the presence of a sulfonyl triazene polymerization catalyst having the general formula

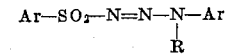

wherein "Ar" and "Ar¹" are substituents selected from the group consisting of aryl and alkaryl groups and "R" is selected from the group consisting of alkyl and cyanoalkyl radicals having from 1 to 4 carbon atoms.

10. A process for catalytically polymerizing a compound of the general formula

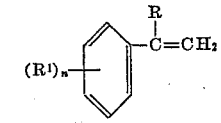

wherein "R" is selected from the group consisting of hydrogen, a halogen and a methyl radical and "R¹" is a substituent selected from the group consisting of hydrogen, a halogen, a lower alkyl radical and a halogenated lower alkyl radical, and "n" is an integer between 0 and 2, comprising reacting said compound in the presence of 1-benzenesulfonyl-3-methyl-3-phenyl triazene as polymerization catalyst.

11. A process for copolymerizing acrylonitrile and a monomer having the general formula

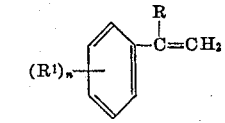

wherein "R" is selected from the group consisting of hydrogen, a halogen and a methyl radical and "R¹" is a substituent selected from the group consisting of hydrogen, a halogen, a lower alkyl radical and a halogenated lower alkyl radical, and "n" is an integer between 0 and 2, comprising reacting said monomers in the presence of 1-benzenesulfonyl-3-methyl-3-phenyl triazene as polymerization catalyst.

12. A process for catalytically polymerizing styrene comprising reacting said styrene in the presence of 1-benzenesulfonyl-3-methyl-3-phenyl triazene as polymerization catalyst.

13. A process for catalytically polymerizing methylstyrene comprising reacting said methylstyrene in the presence of 1-benzenesulfonyl-3-methyl-3-phenyl triazene as polymerization catalyst.

14. A process for catalytically polymerizing a compound of the general formula

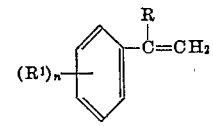

wherein "R" is selected from the group consisting of hydrogen, a halogen and a methyl radical and "R¹" is a substituent selected from the group consisting of hydrogen, a halogen, a lower alkyl radical and a halogenated lower alkyl radical, and "n" is an integer between 0 and 2, comprising reacting said compound in the presence of 1-benzenesulfonyl-3-$\beta$-cyanoethyl-3-phenyl triazene as polymerization catalyst.

15. A process for catalytically copolymerizing acrylonitrile monomer and a monomer having the general formula

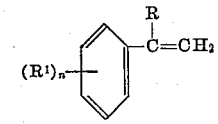

wherein "R" is selected from the group consisting of hydrogen, a halogen and a methyl radical and "R¹" is a substituent selected from the group consisting of hydrogen, a halogen, a lower alkyl radical and a halogenated lower alkyl radical, and "n" is an integer between 0 and 2, comprising reacting said monomers in the presence of 1-benzenesulfonyl-3-$\beta$-cyanoethyl-3-phenyl triazene as polymerization catalyst.

16. A process for catalytically polymerizing acrylonitrile monomer comprising reacting said monomer in the presence of 1-benzenesulfonyl-3-$\beta$-cyanoethyl-3-phenyl triazene as polymerization catalyst.

17. A process for catalytically polymerizing styrene monomer comprising reacting said monomer in the presence of a 1-benzenesulfonyl-3-$\beta$-cyanoethyl-3-phenyl triazene as polymerization catalyst.

18. A process for catalytically polymerizing methyl methacrylate comprising reacting said methyl methacrylate in the presence of a 1-benzenesulfonyl-3-$\beta$-cyanoethyl-3-phenyl triazene as polymerization catalyst.

References Cited in the file of this patent

UNITED STATES PATENTS

| | | |
|---|---|---|
| 2,313,233 | Fryling | Mar. 9, 1943 |
| 2,376,015 | Semon | May 15, 1945 |
| 2,643,990 | Ham | June 30, 1953 |

FOREIGN PATENTS

| | | |
|---|---|---|
| 480,245 | Canada | Jan. 15, 1942 |
| 571,009 | Great Britain | Aug. 1, 1945 |
| 485,440 | Canada | Aug. 5, 1952 |